United States Patent Office 3,538,036
Patented Nov. 3, 1970

3,538,036
CONCRETE COMPOSITION CONTAINING
POLYMERIC ACRYLIC RESIN
Donald J. Peters, Baltimore, and Richard J. Frazier, Towson, Md., assignors to Harry T. Campbell Sons Corporation, Towson, Md., a corporation of Maryland
No Drawing. Filed Apr. 25, 1968, Ser. No. 724,232
Int. Cl. C04b 13/24; C08f 45/24
U.S. Cl. 260—29.6         8 Claims

ABSTRACT OF THE DISCLOSURE

A dry cement composition comprising 20–40 weight percent portland cement, 60–80 weight percent aggregate, 1.3–5.5 weight percent powdered emulsifiable copolymeric methylmethacrylate-ethylmethacrylate resin, 0.08–0.55 weight percent emulsifying agent and 0.08–0.55 weight percent setting accelerator.

---

This invention relates to a cement composition and in particular to a cement composition having surprisingly quick setting, low shrinkage and high bonding characteristics. The cement composition of this invention because of these outstanding characteristics is especially suitable for use in repairing and/or resurfacing concrete surfaces such as driveways, streets, highways, airport runways and other large paved areas. The cement composition of this invention is also ideally suitable for use as a mortar for bonding masonry units such as concrete blocks, bricks, cut stone, ceramic tile and other masonry type products, as a bonding agent between layers of fresh and hardened concrete, as a stucco finish and as a leveller or underlayment material. The present composition is also useful for bonding or coating diverse materials such as wood, plastics, metal, bituminous concrete and glass.

The cement composition of this invention comprises a dry mix of portland cement, finely divided aggregate such as sand, a powdered emulsifiable acrylic resin, sodium citrate emulsifying agent and a setting accelerator such as sodium carbonate. The components forming the cement composition of the present invention are employed in the following weight percent proportions of the total dry mix. The portland cement is present in amounts ranging from about 20–40%; the aggregate, such as sand, is present in amounts ranging from about 60–80%; the powdered, emulsifiable acrylic resin is present in amounts ranging from about 1.3–5.5%; sodium citrate emulsifying agent is present in amounts ranging from about 0.08–0.55%; and a setting accelerator such as sodium carbonate is present in amounts ranging from about 0.08–0.55%.

The emulsifiable acrylic resin employed herein is a copolymeric methylmethacrylate-ethylmethacrylate sold by Rohm and Haas Company under the trade name Resin E–460 has the following properties: appearance—white powder; pH (re-emulsified, 10% solids)—9.5 to 10.0; bulk density (pounds/cubic foot)—31.2; mean particle size after re-emulsification (microns)—0.11; particle size of powder (microns)—50.0 to 75.0. It has been found that to successfully use the powdered, emulsifiable acrylic resin, sodium citrate must be employed as an emulsifying agent in the amounts set forth above. It has also been found that the presence of sodium citrate in the foregoing amounts acts as a setting retarder and that to overcome this disadvantage a setting accelerator, preferably sodium carbonate, must be used to achieve the advantages of this invention.

The aggregate used herein can be natural or artificial substantially chemically inert inorganic material such as natural sand, sand prepared from stone, gravel, slag and the like. The sizing or gradation of the aggregate can vary widely depending on the intended usage of the composition. Preferably, substantially all the aggregate passes through a ¾″ size screen and no more than about 10% by weight passes through a 200 mesh screen. It will be appreciated that the choice of any particular particle size distribution in the aggregate can be controlled to selectively produce a fine texture surface or a coarse surface or a surface whose texture is intermediate these classifications.

The composition of this invention also advantageously can contain a foam inhibiting agent such as sold under the trade name of Colloid 513 DD by Colloids, Inc. or Nopco PD-1 sold by Nopco Chemical Company or other conventional foam inhibiting agents in amounts of about 0.03–0.5 weight percent; a plasticizer for the acrylic resin such as trimethanol ethane, trimethanol propane and the like in amounts of 0.1–0.4 weight percent; conventional antibleeding or thickening agents such as methyl cellulose, ethyl cellulose, hydroxyethyl cellulose and the like in amounts of 0.01–0.05 weight percent.

Other non-reactive organic and inorganic fillers and modifiers can also be included such as carbon black, talcs, glass fibers, zinc oxides, titanium dioxide and other pigments.

The dry mix composition of this invention is suitably admixed with sufficient water to form a hydraulic composition. The amount of water to be used will depend on the consistency desired. Thus where a cement slurry with a paint-like consistency is desired the water content approaches the maximum values whereas cement compositions having thicker consistencies are achieved using lesser or minimum water values. It has been found that to achieve the advantages associated with the cement composition of this invention the weight ratio of water to dry mix ranges between 15–50 parts by weight water to 100 parts by weight dry mix and preferably 18–20 parts by weight water to 100 parts by weight dry mix. Decreasing the water content values significantly lower than that given above substantially prevents effective curing of the cement while increasing the water content values significantly above that called for results in unacceptable prolonged setting times and causes the aggregate in the mix to settle to the bottom of the mixing apparatus.

The dry mix components of the cement composition of this invention can conveniently be thoroughly mixed together in any conventional manner and thereafter when ready for use the desired amount of water within the range specified above can be added to this intimate mixture of the dry ingredients, again, using conventional apparatus and techniques such as well known cement mixers. The dry mix can be intermixed at temperatures ranging from about 0° C. or lower up to about 250° C.

EXAMPLE I

A topping or patching composition is prepared by intimately mixing the following dry ingredients:

| | Percent by wt. |
|---|---|
| Sand | 68.963 |
| Portland cement | 27.50 |
| RE–460 (copolymeric methylmethacrylate-ethylmethacrylate) | 2.75 |
| Sodium citrate | 0.137 |
| Sodium carbonate (anhydrous) | 0.275 |
| Colloids 513–DD (defoamer) | 0.070 |
| Trimethanol ethane (plasticizer) | 0.270 |
| Methyl cellulose | 0.035 |

(This dry mix contained less than 0.1% $H_2O$.)

To 100 parts by weight of the above dry mix composition there is added in a cement mixer with agitation 18 parts by weight of $H_2O$. The topping composition is then trowelled sufficiently to force the mix into the pores of an old concrete surface thus providing a neat looking fresh concrete surface.

A similar hydraulic composition using instead 20 parts by weight of water per 100 parts of dry mix ingredients is also suitable for patching or topping irregular or cracked concrete surfaces and provides equally advantageous results. The freshly applied cement composition of this invention sets in about one hour and can be exposed to light traffic within 24–48 hours or heavy traffic after about 3 days. The fresh surface can be applied in thicknesses up to 0.5" or greater.

EXAMPLE II 100 parts by weight of the dry mix cement composition of Example I was admixed with 40 parts by weight of water to produce slurry having a thick paint like or thick pancake batter-like consistency. A worn driveway previously cleaned of oil and grease spots by application thereto of a suitable solvent such as mineral spirits, gasoline, conventional cleaning fluids or the like followed by washing with hot water and a household detergent was resurfaced by spreading the above hydraulic cement composition thereon. Generally the cement composition can be applied in amounts sufficient to provide a fresh surface having a thickness of about 1/16 inch.

A similar hydraulic cement composition is useful as a stucco finish, as a bonding agent between layers of fresh and hardened concrete or as a sealing agent for swimming pools, patio decks and the like. The composition can be applied by brushing, spraying, trowelling or the like.

EXAMPLE III

A masonry mortar is prepared by admixing with 100 parts by weight of dry cement composition of this invention as set forth in Example I, 25 parts by weight of water. The mortar is advantageously used in bonding such masonry products as bricks, concrete blocks, ceramic tile and the like.

A cement composition differing essentially from the composition of this invention only in the omission of the dry powdered copolymeric methylmethacrylate-ethylmethacrylate was compared with the cement composition of this invention and it was found that when the compositions were air cured under the same conditions the cement composition of this invention provided the following surprising advantages:

| Tensile strength, p.s.i.: | Percent [1] |
|---|---|
| 7 days air cure | 110 |
| 7 days air cure at 25° and 50% relative humidity and 7 days water soak (total immersion in water at 25° C.) | 10 |
| Compressive strength, p.s.i.: | |
| 7 days air cure | 16 |
| 7 days air cure at 25° C. and 50% relative humidity and 7 days water soak (total immersion in water at 25° C.) | 31 |
| Flexural strength, p.s.i. | 108 |
| Shear bond strength, p.s.i.: | |
| 7 days air cure | 294 |
| 7 days air cure at 25° C. and 50% relative humidity and 7 days water soak (total immersion in water at 25° C.) | 61 |
| Impact strength, inch-pounds: | |
| 7 days air cure | 80–85 |
| Abrasion resistance, percent wt. loss (reduction): | |
| 7 days air cure | 90 |

[1] Increase of composition of invention over unmodified composition.

The above results were achieved using the following test procedures: Tensile strength—1" thick briquettes, ASTM C–190–63; compressive strength—2" cubes, ASTM C–109–64; flexural strength—flexural bar, ASTM C–348–61T; shear bond strength—2" x 2" x 0.5" specimen of the polymer modified cement and unmodified cement mortar patches are each centrally cast and cured on a 4" x 2.5" x 0.75" cured unmodified concrete base piece. A plunger applies a load of 0.05 inches per minute to each of the patches until failure occurs. The shear bond strength (p.s.i.) equals the load in pounds divided by the interfacial area of the patch in square inches; impact strength—Gardner Impact Tester 1G–1115 mounted on a 1.25 inch thick slab of chemstone. Testing is done on a 0.75 inch thick wood table top supported on iron legs. Mortar specimens, having the following dimensions 5.0 x 2.375 x 0.75 inches are prepared. Specimens are impacted until break in one of the following series of increments: 2, 4, 6, 8, 10 . . . inch-pounds; 2, 6, 10, 14, 18 . . . inch-pounds; 6, 12, 18, 24 . . . inch-pounds. An average of 5 samples of each type mortar is taken; abrasion resistance—A model 174 Taber Abrader equipped with a H-22 calibrade abrasion wheel is employed. Cylindrical mortar specimens (4⅝" x ½") are prepared and are subjected to 1,000 cycles under a load of 1,000 grams.

Obviously many modifications and variations of the present invention are possible in light of the above description and it is therefore to be understood that all matter hereinbefore set forth is to be interpreted as illustrative and not in a limiting sense.

What is claimed is:

1. A dry cement composition consisting essentially of 20–40 weight percent portland cement, 60–80 weight percent aggregate, 1.3–5.5 weight percent emulsifiable copolymeric methylmethacrylate-ethylmethacrylate, 0.08–0.55 weight percent sodium citrate as emulsifying agent and 0.08–0.55 weight percent sodium carbonate as setting accelerator.

2. The dry cement composition of claim 1 wherein the aggregate is sand.

3. The dry cement composition of claim 1 including 0.03–0.50 weight percent defoaming agent.

4. The dry cement composition of claim 1 including 0.01–0.40 weight percent plasticizer.

5. The dry cement composition of claim 1 including 0.01–0.05 weight percent thickening agent.

6. A hydraulic cement composition comprising 15–50 parts by weight of water to 100 parts by weight of a dry cement composition consisting essentially of 20–40 weight percent portland cement, 60–80 weight percent aggregate, 1.3–5.5 weight percent powdered, emulsifiable copolymeric methylmethacrylate-ethylmethacrylate, 0.08–0.55 weight percent sodium citrate as emulsifying agent and 0.08–0.55 weight percent sodium carbonate as setting accelerator.

7. The hydraulic cement composition of claim 6 wherein the water is present in amounts of 18–20 parts by weight per 100 parts by weight of said dry cement composition.

8. The hydraulic cement composition of claim 6 wherein the aggregate is sand.

References Cited

UNITED STATES PATENTS

| 2,174,051 | 9/1939 | Winkler | 106—90 X |
| 3,126,355 | 3/1964 | Birten et al. | 260—29.65 X |
| 3,196,122 | 7/1965 | Evans | 260—29.65 |
| 3,210,207 | 10/1965 | Dodson | 106—90 |
| 3,256,229 | 6/1966 | Janota et al. | 260—29.65 |

MURRAY TILLMAN, Primary Examiner

H. ROBERTS, Assistant Examiner